(12) United States Patent
Swart

(10) Patent No.: US 7,716,906 B2
(45) Date of Patent: May 18, 2010

(54) SINGLE LEVER MOWER DECK HEIGHT-OF-CUT CONTROL

(75) Inventor: Benjamin Jerry Swart, Allenton, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/969,342

(22) Filed: Jan. 4, 2008

(65) Prior Publication Data

US 2009/0173052 A1 Jul. 9, 2009

(51) Int. Cl.
*A01D 34/00* (2006.01)
(52) U.S. Cl. .......................... 56/17.1; 56/14.9
(58) Field of Classification Search ................ 56/14.7, 56/15.2, 15.7, 17.1, 15.8, 15.1, DIG. 22
See application file for complete search history.

(56) References Cited

U.S. PATENT DOCUMENTS

| | | | | |
|---|---|---|---|---|
| 3,234,719 A * | 2/1966 | Rank | .................... | 56/13.6 |
| 3,283,486 A * | 11/1966 | Marek et al. | ................ | 56/16.3 |
| 3,654,749 A * | 4/1972 | Ostergren et al. | .......... | 56/15.8 |
| 3,677,574 A | 7/1972 | Cyr | | |
| 4,120,136 A * | 10/1978 | Rose | .................... | 56/17.1 |
| 4,321,784 A * | 3/1982 | Wood et al. | .............. | 56/17.2 |
| 4,664,405 A | 5/1987 | Bedis | | |
| 5,079,926 A * | 1/1992 | Nicol | ................... | 56/12.7 |
| 5,142,850 A | 9/1992 | Patterson et al. | | |
| 5,381,648 A | 1/1995 | Seegert et al. | | |
| 5,410,865 A * | 5/1995 | Kurohara et al. | ............ | 56/15.9 |
| 5,813,203 A * | 9/1998 | Peter | ...................... | 56/17.2 |
| 5,816,033 A * | 10/1998 | Busboom et al. | ............ | 56/10.8 |
| 6,023,921 A * | 2/2000 | Burns et al. | .................. | 56/16.3 |
| 6,122,903 A * | 9/2000 | Hayashi et al. | .............. | 56/15.8 |
| 6,293,077 B1 * | 9/2001 | Plas et al. | .................... | 56/17.1 |
| 6,347,502 B1 * | 2/2002 | DeVries | ..................... | 56/15.7 |
| 6,494,028 B2 * | 12/2002 | Moore | ........................ | 56/17.1 |
| 6,530,200 B1 * | 3/2003 | Minoura et al. | ............. | 56/17.1 |
| 6,658,831 B2 * | 12/2003 | Velke et al. | .................. | 56/14.7 |
| 6,675,567 B2 * | 1/2004 | Samejima et al. | ........... | 56/16.7 |
| 6,837,032 B1 * | 1/2005 | Swartzendruber et al. | .... | 56/14.9 |
| 7,003,937 B1 * | 2/2006 | Tarver | ....................... | 56/17.1 |
| 7,013,626 B1 * | 3/2006 | Strope | ....................... | 56/15.8 |
| 7,146,786 B2 * | 12/2006 | Brandon | ..................... | 56/14.9 |
| 7,430,847 B2 * | 10/2008 | Hoffman et al. | ............. | 56/10.8 |
| 2005/0044836 A1 * | 3/2005 | Goto et al. | ................... | 56/14.7 |
| 2007/0039304 A1 * | 2/2007 | Wright et al. | ................ | 56/14.9 |

FOREIGN PATENT DOCUMENTS

| | | |
|---|---|---|
| EP | 0144214 | 6/1985 |
| EP | 0696413 | 2/1996 |

* cited by examiner

*Primary Examiner*—Árpád Fábián-Kovács

(57) ABSTRACT

A single lever mower deck height-of-cut control provides a hand control connected to a depth stop cam that is movable to a plurality of cutting height positions. A push button switch on the hand control may be actuated to extend a hydraulic lift mechanism against a lift arm to raise the mower deck. The mower deck descends while the push button switch is not actuated until the lift arm engages the depth stop cam at a specified cutting height position.

6 Claims, 5 Drawing Sheets

SINGLE LEVER MOWER DECK HEIGHT-OF-CUT CONTROL

FIELD OF THE INVENTION

This invention relates generally to grass mowing machines, and particularly to height-of-cut control mechanisms for mower decks on grass mowing machines.

BACKGROUND OF THE INVENTION

Grass mowing machines such as lawn and garden tractors, with rotary cutting blades positioned under a mower deck, commonly include a mechanical locking mechanism to control the operating height-of-cut. A mower deck lifting mechanism, such as a hydraulically assisted mower deck lift, may operate independently of the height-of-cut control. Because the two mechanisms operate independently of each other, the operator must use them in a specified sequence. The sequence includes actuating the lift mechanism to lift the deck, repositioning the locking mechanism at the desired height-of-cut, and then reactuating the lift mechanism to engage the height-of-cut locking mechanism.

Some operators, however, have difficulty operating both mechanisms in the proper sequence. If the operator does not perform these steps in the right sequence, the mower deck lift mechanism may be unable to maintain a constant height-of-cut, due to inefficiencies in the mechanism. If an operator improperly positions the mower deck solely with the lift mechanism, he or she may neglect to position the lock mechanism. In general, many operators do not find it intuitive to perform the correct sequence when operating both of the deck lift and height-of-cut locking mechanisms.

An improved mechanism is needed to control the operating height-of-cut of a mower deck under a lawn and garden tractor, and to raise and lower the mower deck between different cutting heights. A control is needed that an operator can use to lift the mower deck, as well as lock the deck at each desired cutting height.

SUMMARY OF THE INVENTION

A single lever mower deck height-of-cut control is provided for a grass mowing machine. The single lever mower deck height-of-cut control may be used to lift the mower deck, as well as lock the deck at each desired cutting height. A hand control is connected to a depth stop cam having a plurality of steps. Each step corresponds to a different cutting height. The hand control may be pivoted to raise and lower the depth stop cam to a plurality of positions. The single lever mower deck height-of-cut control also includes an actuator on the hand control having a first position to pivot a pair of lift arms to lift the mower deck and a second position to lower the mower deck. One of the lift arms engages a selected step on the depth stop cam for a specified cutting height when the mower deck is lowered to said specified cutting height.

DESCRIPTION OF THE PREFERRED EMBODIMENT

Figure 1:
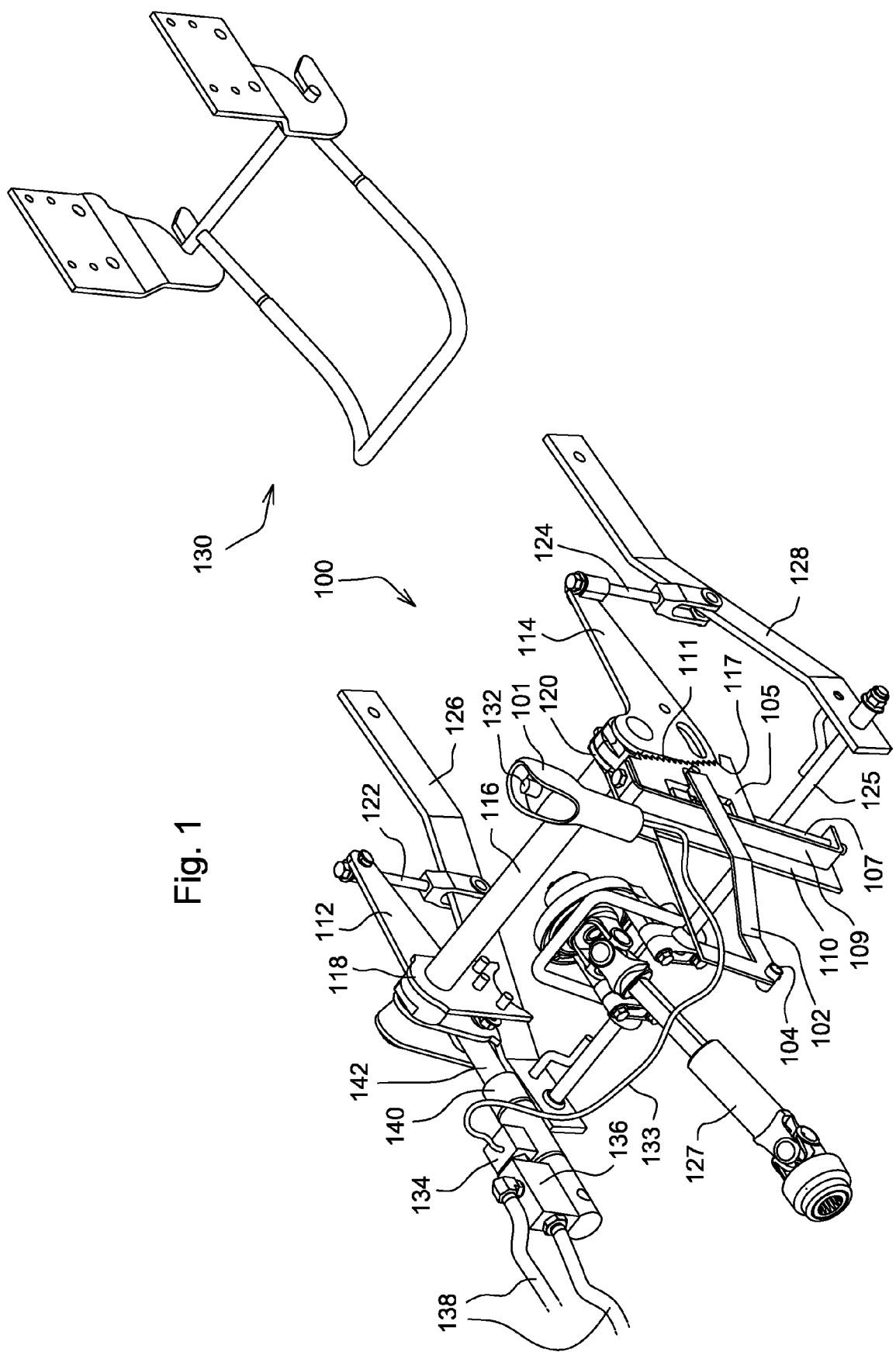
FIG. 1 is a perspective view of a single lever mower deck height-of-cut control according to a first embodiment of the invention.

In a first embodiment of single lever mower deck height-of-cut control 100 shown in FIGS. 1-5, hand control 101 may be provided in a position near an operator's seat of a grass mowing machine. The single lever mower deck height-of-cut control may be used on various grass mowing machines including lawn and garden tractors, zero turning radius machines, or other machines having one or more cutting blades that rotate on a generally vertical axes under a mower deck.

In one embodiment, hand control 101 may be fastened to a first or upper end of L-shaped lever 102, which pivots on bearing 104 mounted to the frame of the grass mowing machine. The second or lower end of the L-shaped lever is pivotably connected to depth stop cam 105. The depth stop cam can be raised and lowered to a plurality of height-of-cut positions between a maximum and a minimum height-of-cut. For example, the depth stop cam may slide vertically between the height-of-cut positions on rod 107. Rod 107 may have opposing ends held by bracket 109 mounted to plate 110. The depth stop cam may be any device that the hand control can raise and lower to a specific cutting height, and that provides a stop that may be engaged at the specified cutting height once the deck descends to the operating position.

In one embodiment, one edge or surface of the depth stop cam may be provided with a plurality of steps 111, each step corresponding to a different height-of-cut position for the mower deck and the blades rotating under the deck. For example, the depth stop cam may include fifteen steps that provide height-of-cut settings between one inch and 5½ inches, in ¼ inch or ½ inch increments.

In one embodiment, the single lever mower deck height-of-cut control may include first lift arm 112 and second lift arm 114 connected by rockshaft 116 to pivot together between a fully raised and a lowered deck position. The rockshaft may be supported by brackets 118, 120 fastened to the frame of the mowing machine. One of the lift arms may engage a step on the depth stop cam at the desired cutting height. That lift arm may include a tooth 117 or pawl to engage a step on the depth stop cam at the specified cutting height.

In one embodiment, lift links 122, 124 are pivotably suspended from the outer ends of the lift arms, and draft arms 126, 128 are suspended from the lift links by devises. The draft arms support at least part of the mower deck. For example, in one embodiment, the draft arms may be attached to and support a rear portion of the deck, and front linkage 130 may support the front portion of the deck, together providing a four bar linkage. Additionally, rod 125 may extend between draft arms 126, 128, and may support PTO shaft 127 which provides rotational power to the mower blades under the deck.

In one embodiment, switch 132 may be provided in and included on the hand control 101. The switch may be a push button switch that while actuated while actuated raises the mower deck using a hydraulic piston, or using an electric lift mechanism. The switch may complete an electrical circuit connected via wires 133 to an electrical power source (not shown) and solenoid 134. If the switch is actuated and solenoid 134 is powered, the solenoid opens two-position hydraulic valve 136. Opening the two-position hydraulic valve causes hydraulic fluid to flow through hydraulic conduits 138 to extend lift cylinder 140. The cylinder rod 142 is connected to lift arm 112, and when extended can lift the mower deck to the fully raised or maximum height position. The cylinder rod may have a transverse pin 144 in slot 146 in lift arm 111. Alternatively, the push button switch may actuate an electric motor or lift screw, instead of a hydraulic lift cylinder, to raise the mower deck.

In one embodiment, lever 102 and/or depth stop cam 105 may have one or more detents to help hold the lever and depth stop cam at each specified height-of-cut position. Additionally, a cutting height scale 147 may be provided adjacent L-shaped lever to indicate the specified cutting height to the operator.

Figure 2:
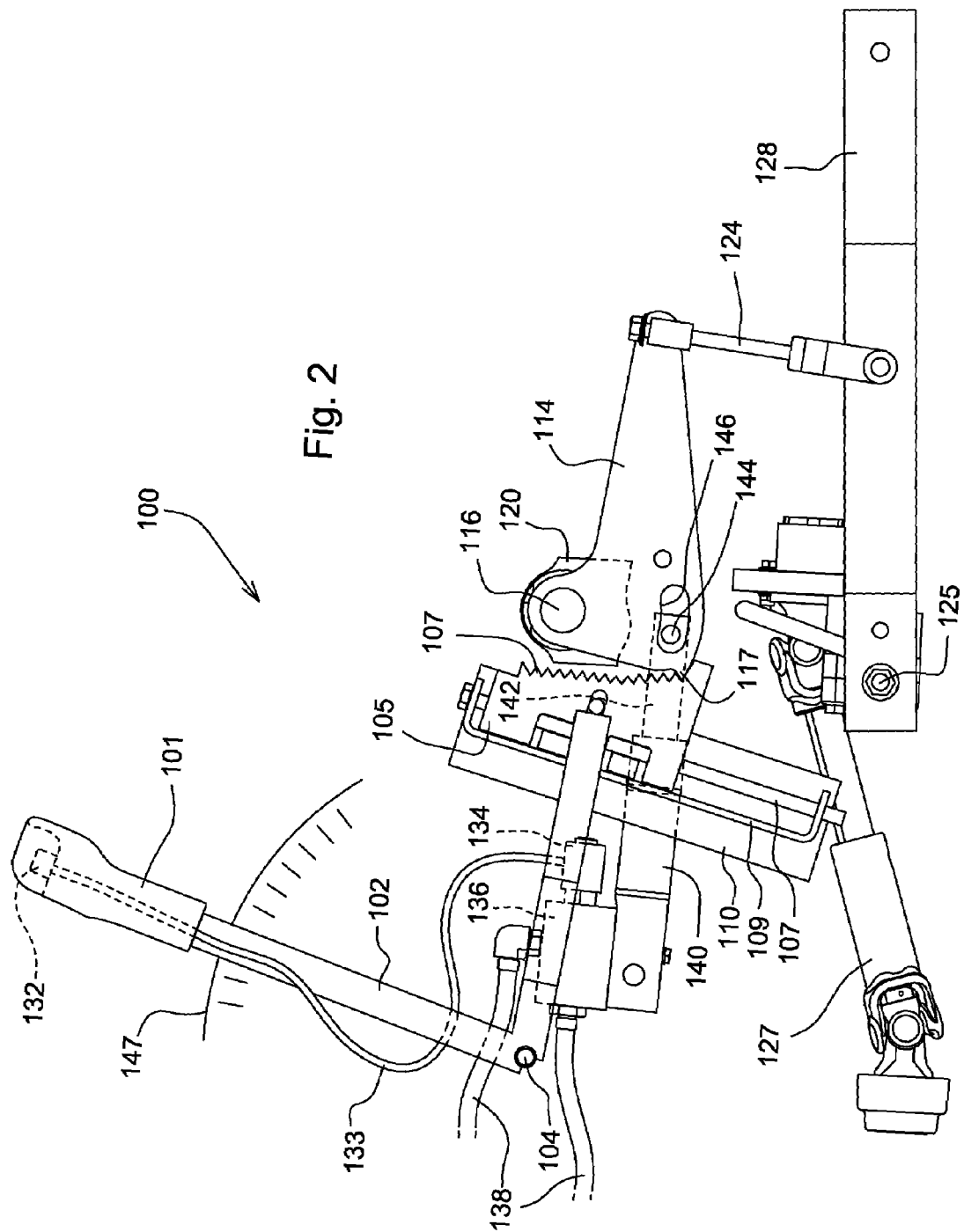
FIG. 2 is a side view of a single lever mower deck height-of-cut control according to a first embodiment of the invention, in a lowered deck position with the height-of-cut control engaged at a maximum height-of-cut setting.

In FIG. 2, the single lever mower deck height-of-cut control is shown in a lowered deck position with the lift arm engaged to depth stop cam 105 at a maximum height-of-cut setting. The weight of the mower deck urges the lift arm to pivot in a direction tending to apply a horizontal force against the depth stop cam. In turn, lift arm force against the depth stop cam provides a force against bracket 109, holding the depth stop cam firmly in place at the specified cutting height.

Figure 3:
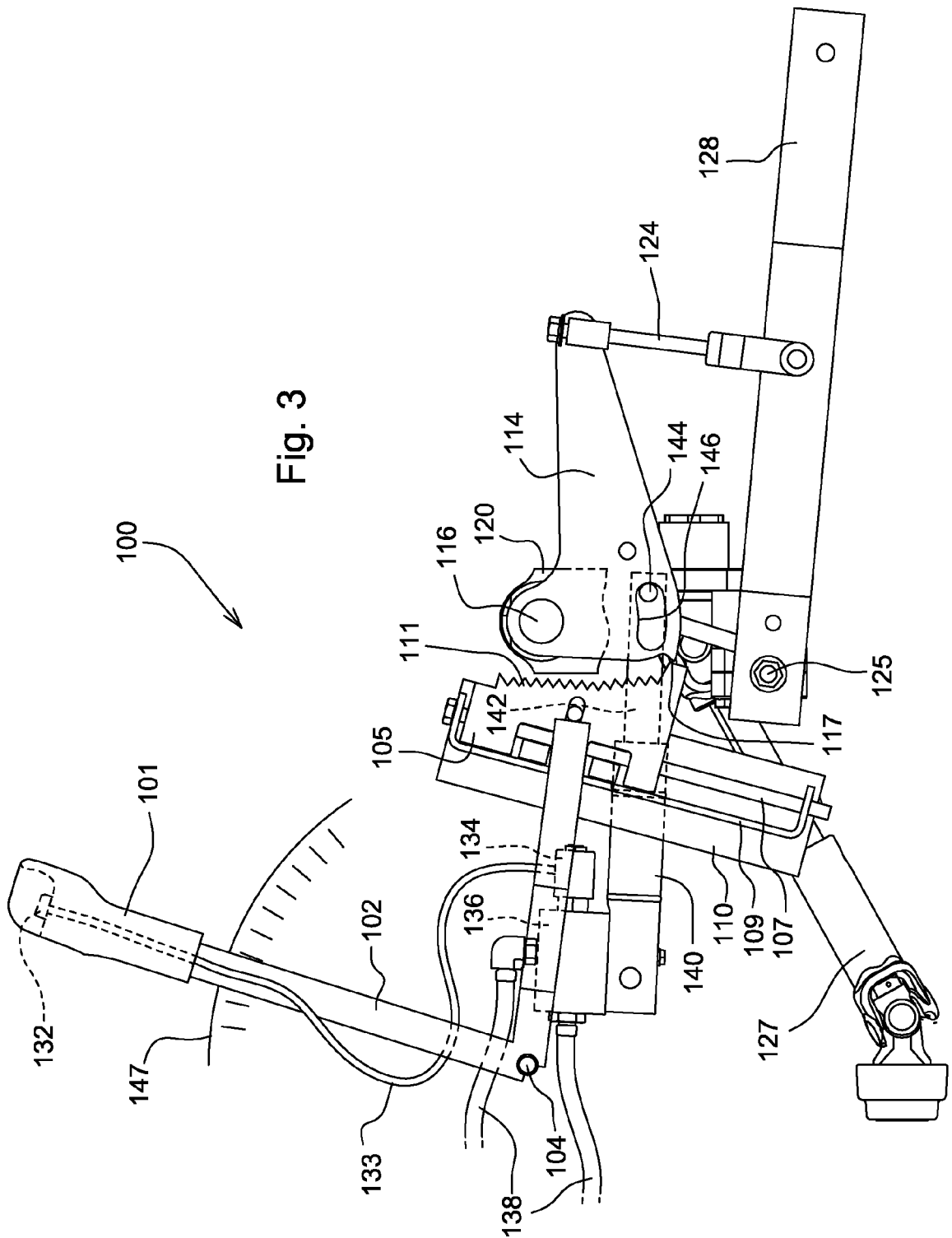
FIG. 3 is a side view of a single lever mower deck height-of-cut control according to a first embodiment of the invention, in a raised deck position with the height-of-cut control disengaged at a maximum height-of-cut setting.

In FIG. 3, the mower deck has been raised to a maximum height by actuating switch 132 to extend rod 142 from cylinder 140. The lift arm has been disengaged from the depth stop cam, and has been moved by the operator to a maximum height-of-cut setting.

Figure 4:
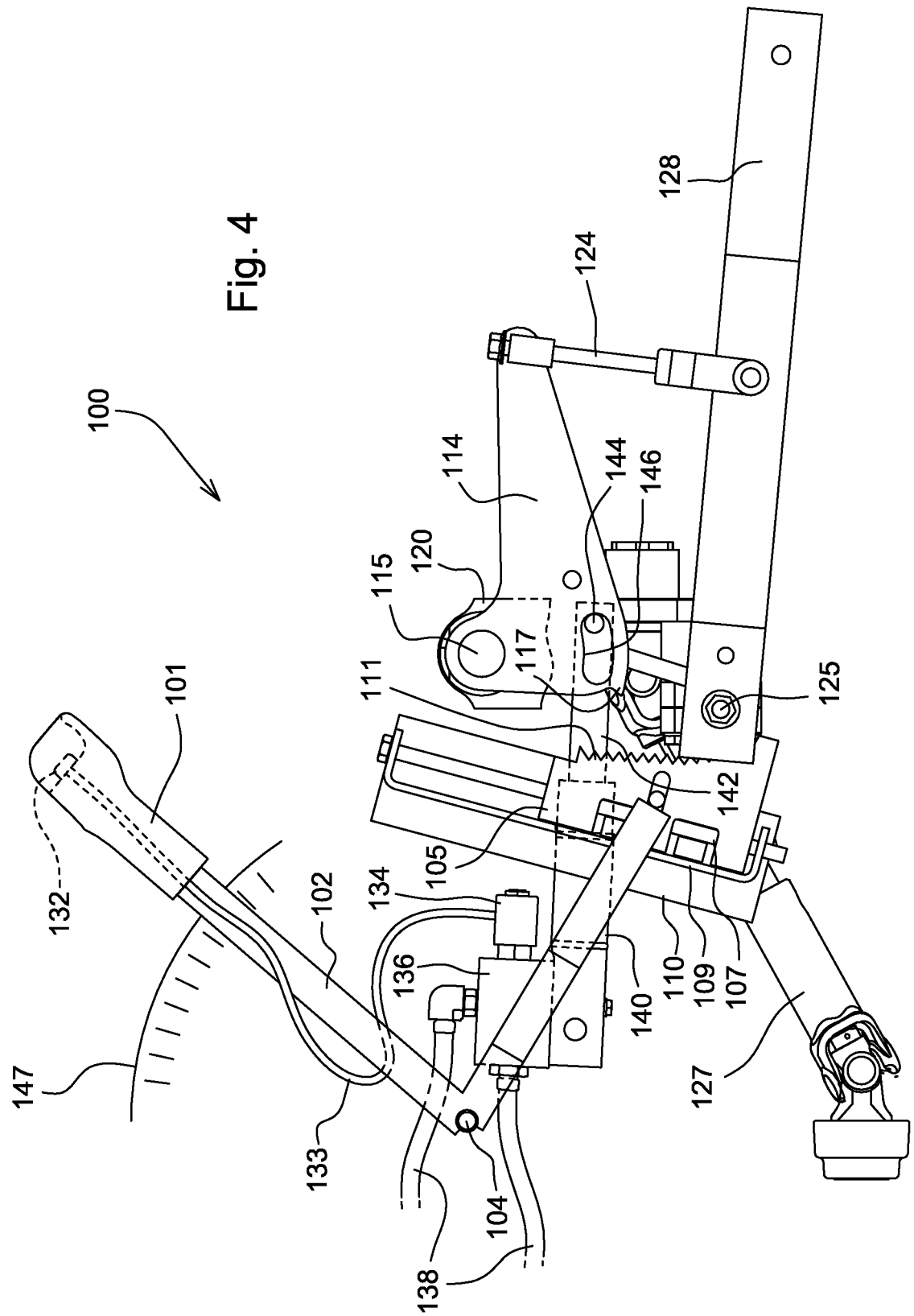
FIG. 4 is a side view of a single lever mower deck height-of-cut control according to a first embodiment of the invention, in a raised deck position with the height-of-cut control disengaged at a minimum height-of-cut setting.

In FIG. 4, the mower deck remains raised at a maximum height because switch 132 is still actuated, but the operator has moved the height-of-cut control down to a minimum height-of-cut setting.

Figure 5:
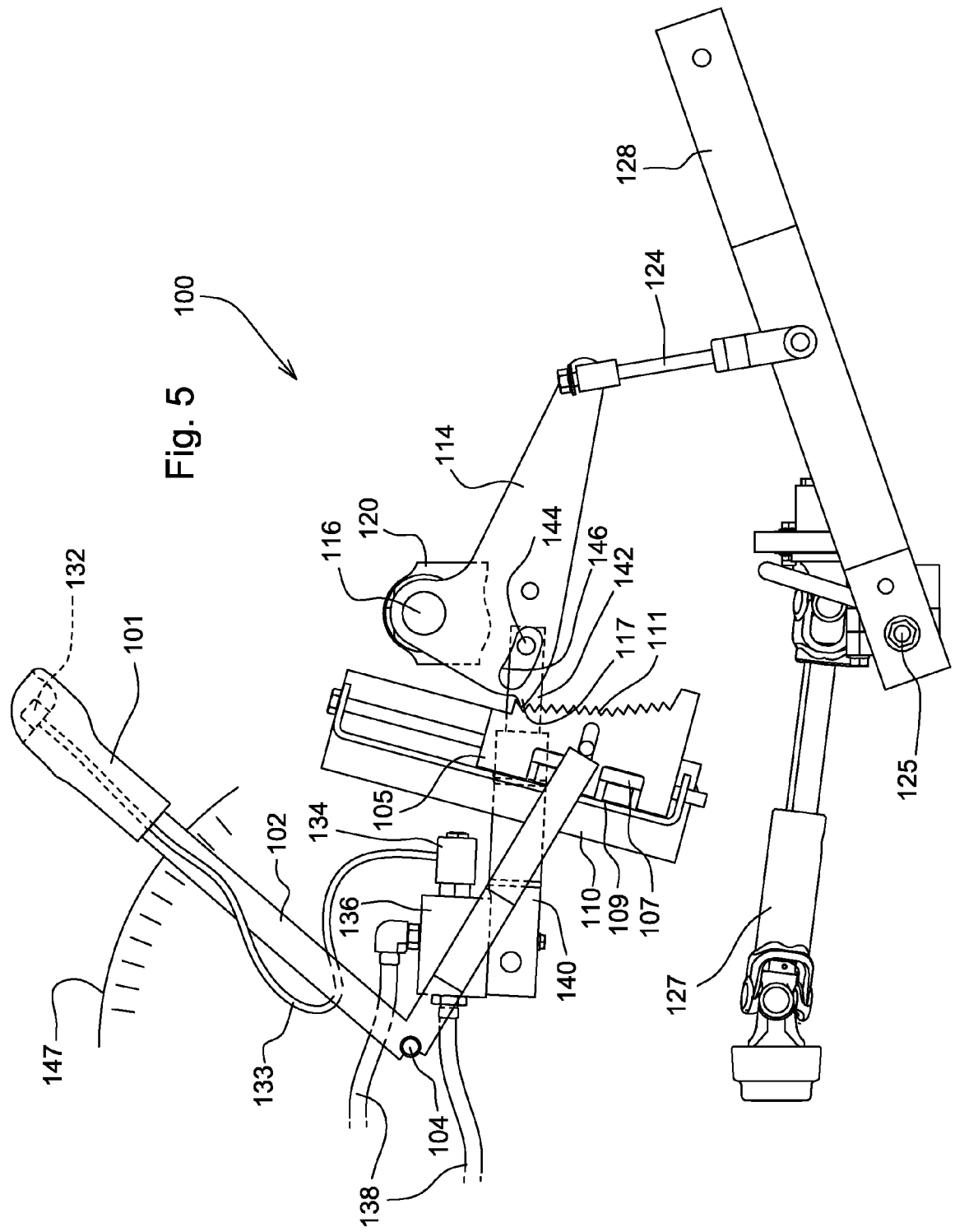
FIG. 5 is a side view of a single lever mower deck height-of-cut control according to a first embodiment of the invention, in a lowered deck position with the height-of-cut control engaged at a minimum height of cut setting.

In FIG. 5, the mower deck is lowered because switch 132 is no longer actuated. Because the switch is not actuated, the two position hydraulic valve allows the deck to float down by releasing hydraulic fluid from the cylinder when switch 132 is not actuated. As a result, the mower deck may descend by means of gravity, dampened by the hydraulic cylinder, until lift arm 114 engages the depth stop cam at the desired cutting height setting. In FIG. 5, the lift arm is shown engaged to the depth stop cam at a minimum height-of-cut setting.

Having described a preferred embodiment, it will become apparent that various modifications can be made without departing from the scope of the invention as defined in the accompanying claims.

The invention claimed is:

1. A single lever mower deck height-of-cut control comprising:
   a hand control connected to a depth stop cam having a plurality of steps to support a mower deck, each step corresponding to a different cutting height, the hand control movable to slide the depth stop cam vertically to a plurality of positions;
   an actuator on the hand control that is movable with respect to the hand control to a first position to lift the mower deck to disengage the depth stop cam and a second position to lower the mower deck to engage the depth stop cam; and
   a selected step on the depth stop cam being engaged at a specified cutting height when the mower deck is lowered to said specified cutting height.

2. The single lever mower deck height-of-cut control of claim 1 wherein a lift arm engages the selected step on the depth stop cam.

3. The single lever mower deck height-of-cut of claim 2 wherein the lift arm provides a force against the depth stop cam tending to hold the depth stop cam in place.

4. A single lever mower deck height-of-cut control comprising:
   a hand control connected to a depth stop cam having a plurality of steps to support a mower deck, each step corresponding to a different cutting height, the hand control movable to raise and lower the depth stop cam to a plurality of positions;
   an actuator on the hand control that is movable with respect to the hand control to a first position to lift the mower deck to disengage the depth stop cam and a second position to lower the mower deck to engage the depth stop cam; and
   a selected step on the depth stop cam being engaged at a specified cutting height when the mower deck is lowered to said specified cutting height;
   wherein the actuator in the first position completes an electrical circuit to raise the mower deck.

5. A single lever mower deck height-of-cut control comprising:
   a hand control connected to a depth stop cam having a plurality of steps to support a mower deck, each step corresponding to a different cutting height, the hand control movable to raise and lower the depth stop cam to a plurality of positions;
   an actuator on the hand control that is movable with respect to the hand control to a first position to lift the mower deck to disengage the depth stop cam and a second position to lower the mower deck to engage the depth stop cam; and
   a selected step on the depth stop cam being engaged at a specified cutting height when the mower deck is lowered to said specified cutting height;
   wherein the actuator in the first position causes a hydraulic piston to raise the mower deck.

6. A single lever mower deck height-of-cut control comprising:
   a hand control connected to a depth stop cam having a plurality of steps to support a mower deck, each step corresponding to a different cutting height, the hand control movable to raise and lower the depth stop cam to a plurality of positions;
   an actuator on the hand control that is movable with respect to the hand control to a first position to lift the mower deck to disengage the depth stop cam and a second position to lower the mower deck to engage the depth stop cam; and
   a selected step on the depth stop cam being engaged at a specified cutting height when the mower deck is lowered to said specified cutting height;
   wherein the actuator in the second position allows the mower deck to float down to the specified cutting height.

* * * * *